United States Patent
Rojas et al.

(10) Patent No.: US 10,820,570 B2
(45) Date of Patent: Nov. 3, 2020

(54) PET FEEDER

(71) Applicants: Graciela Rojas, Surprise, AZ (US);
Elda Yaneth Castro, Surprise, AZ (US)

(72) Inventors: Graciela Rojas, Surprise, AZ (US);
Elda Yaneth Castro, Surprise, AZ (US)

( * ) Notice: Subject to any disclaimer, the term of this patent is extended or adjusted under 35 U.S.C. 154(b) by 174 days.

(21) Appl. No.: 16/151,848

(22) Filed: Oct. 4, 2018

(65) Prior Publication Data
US 2020/0107521 A1 Apr. 9, 2020

(51) Int. Cl.
*A01K 5/01* (2006.01)
*A01M 1/14* (2006.01)
*A01M 29/32* (2011.01)

(52) U.S. Cl.
CPC ............ *A01K 5/0142* (2013.01); *A01M 1/14* (2013.01); *A01M 29/32* (2013.01)

(58) Field of Classification Search
CPC . A01K 5/0142; A01K 39/0113; A01K 5/0114
USPC ................... 119/61.53, 52.1, 62, 63
See application file for complete search history.

(56) References Cited

U.S. PATENT DOCUMENTS

| | | | | |
|---|---|---|---|---|
| 5,492,083 A | * | 2/1996 | Holladay | A01K 5/0114 119/52.1 |
| 5,954,011 A | * | 9/1999 | Martinez | A01K 5/025 119/62 |
| 7,146,929 B2 | * | 12/2006 | Ritchey | A01K 5/0142 119/61.53 |
| 8,360,005 B1 | * | 1/2013 | Allen | A01K 5/0142 119/61.53 |
| 2006/0005775 A1 | * | 1/2006 | Ritchey | A01K 5/0142 119/61.5 |

OTHER PUBLICATIONS

Umbra, Grand Can Black; retrieved from http://www.umbra.com/usd/catalog/product/view/id/3364/s/grand-can/; 5 pages.

* cited by examiner

*Primary Examiner* — Yvonne R Abbott-Lewis
(74) *Attorney, Agent, or Firm* — Fish & Richardson P.C.

(57) ABSTRACT

A dog feeder that includes a base, a lid, and a coupler. The base includes a left wall and a right wall that extend vertically away from a tray between the left wall and the right wall. The tray is configured to contain dog food. The lid includes a front side and a back side, where the front side includes a protrusion that protrudes outwards away from the back side. The coupler couples the base to the lid such that the lid is capable of swinging between the left wall and the right wall. The protrusion is configured such that when a head of a dog pushes against the protrusion to swing the lid to expose the tray, ears of the dog do not reach an edge of the lid.

10 Claims, 5 Drawing Sheets

PET FEEDER

BACKGROUND

A pet bowl may be used to feed a pet. However, other animals besides the pet may take food from the bowl. For example, ants may climb into the pet bowl or birds may eat pet food from the bowl. Accordingly, a pet feeder that enables pets to eat from the pet feeder but prevents other animals other than the pet from eating from the pet feeder may be useful.

SUMMARY

According to at least one aspect of the subject matter disclosed by this specification, a dog feeder includes a base, a lid, and a coupler. The base includes a left wall and a right wall that extend vertically away from a tray between the left wall and the right wall. The tray is configured to contain dog food. The lid includes a front side and a back side, where the front side includes a protrusion that protrudes outwards away from the back side. The coupler couples the base to the lid such that the lid is capable of swinging between the left wall and the right wall. The protrusion is configured such that when a head of a dog pushes against the protrusion to swing the lid to expose the tray, ears of the dog do not reach an edge of the lid.

This version, and other versions, may optionally include one or more of the following features. For example, the base and lid may be configured such that when the lid is in a resting position, the tray can not be accessed by birds. In some aspects, the protrusion is transparent such that dog food in the tray is visible through the protrusion. In certain aspects, a weight hangs between the front side and the back side and weights the lid to return to a position in relation to the base. In some implementations, the back side includes a second protrusion that protrudes outwards away from the front side, where the second protrusion is configured such that when a head of a dog pushes against the second protrusion to swing the lid to expose the tray, ears of the dog do not reach an edge of the lid. In some aspects, the lid is formed of a single piece that is curved, where the front side is formed from a first end of the single piece and the back side is formed from a second end of the single piece. In certain aspects, the base includes multiple feet that are configured to rest on a surface and lift the tray away from the surface. In some implementations, the base includes four feet. In some aspects, each foot includes an ant trap that includes an adhesive that adheres ants and a cover that at least partially covers the adhesive. In some implementations, the base include tracks that are configured to enable the tray to slide out from under the lid.

The details of these, and other, implementations are set forth in the accompanying drawings and the description below. Other features and advantages will be apparent from the description and drawings, and from the claims.

BRIEF DESCRIPTION OF THE DRAWINGS

FIG. 1 illustrates a perspective view of an example pet feeder that a dog is feeding from.

Like reference numbers and designations in the various drawings indicate like elements.

DETAILED DESCRIPTION

Figure 1:
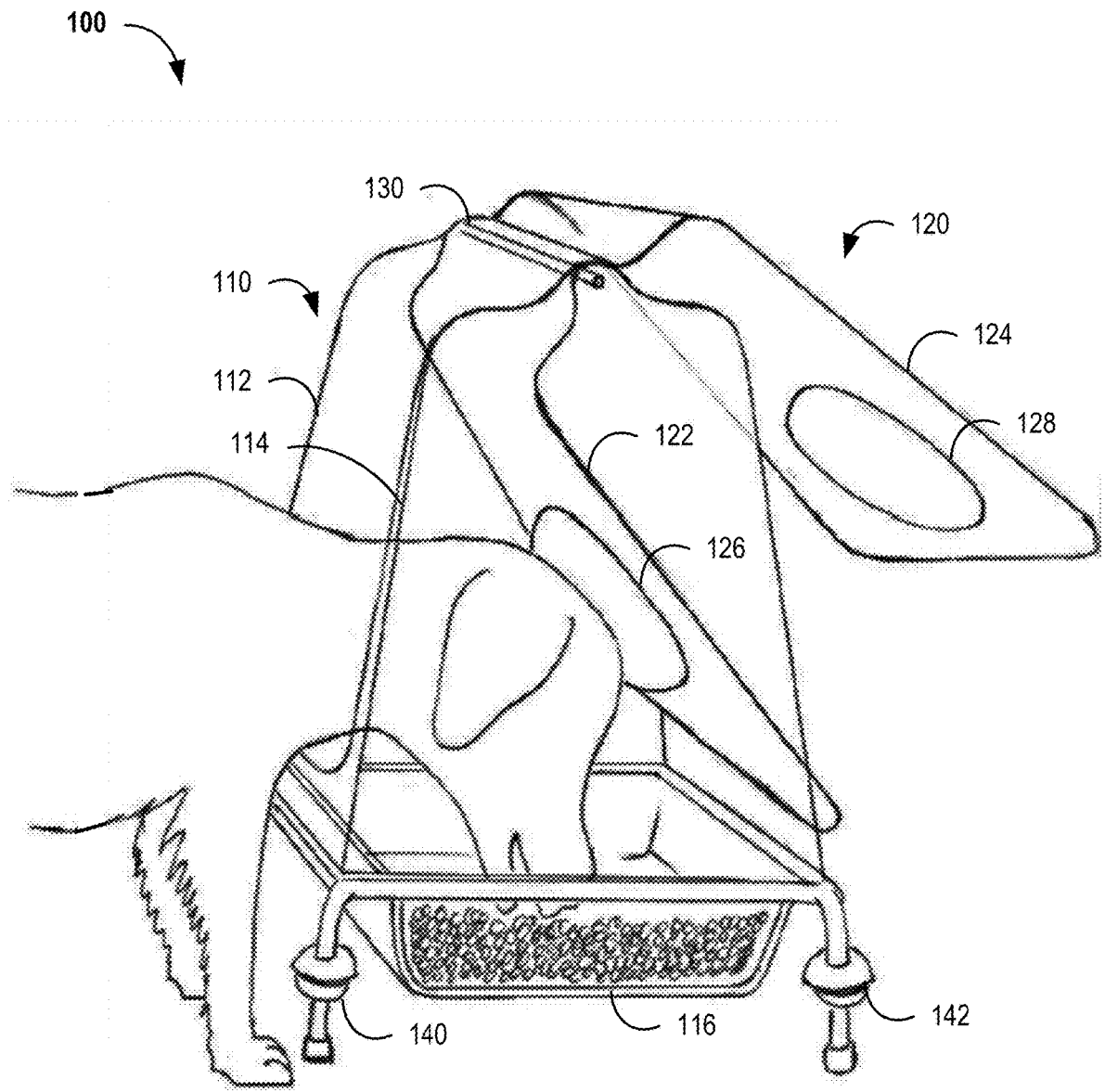

FIG. 1 illustrates a perspective view of an example pet feeder 100 that a dog is feeding from. The pet feeder 100 includes a base 110 that is coupled to a lid 120 by a coupler 130. In more detail, the base 110 may include a left wall 112 and a right wall 114 that extend vertically away from a tray 116 between the left wall 112 and the right wall 114. The left wall 112 and right wall 114 may be shaped substantially similar. For example, the left wall 112 and right wall 114 may each have a straight bottom that tapers as the walls 112, 114 extend from the tray 116 and have a curved top where the coupler 130 is coupled to the walls 112, 114.

The tray 116 may be configured to contain pet food. For example, the tray 116 may have a bottom and four walls that extend upwards from the bottom so that pet food is contained within the bottom and four walls. In another example, the tray 116 may be a bowl that is semi-spherical shaped.

The left wall 112 and right wall 114 may border a front wall of the base 110. The front wall may be between the left wall 112 and the right wall 114 and may form an opening through which a pet may reach food inside the pet feeder 100. For example, the front wall may form an opening that is shaped like a portion of the lid 120 such that when the lid 120 is hanging by gravity the lid 120 covers the opening in the front wall and when the lid 120 is pushed to swing inwards the opening in the front wall is uncovered.

The base 110 may also include multiple feet that are configured to rest on a surface and lift the tray 116 away from the surface. For example, the base 110 may include three, four, or some other number of feet that lift the tray 116 off the ground. Lifting the tray 116 away from the ground may prevent pests such as insects from crawling up from the ground the tray 116.

In some implementations, the base 110 may include one or more ant traps 140, 142 that include an adhesive that adheres ants and a cover that at least partially covers the adhesive. For example, each foot of the base 110 may include a leg onto which an ant trap is attached. Accordingly, the ant traps 140, 142 may prevent ants from crawling up legs of the base 110 and into the tray 116. The ant traps 140, 142 may be removable such that the ant traps 140, 142 may be replaced as needed. For example, an ant trap may be replaced every week to ensure that the adhesive does not become non-functional. The feet of the base 110 may each be covered by a rubber cap to keep the pet feeder 100 from sliding on a surface and prevent the pet feeder 100 from damaging the surface, e.g., so that the pet feeder 100 can be safely used on hardwood flooring.

In some implementations, the base 110 includes tracks that are configured to enable the tray 116 to slide out from under the lid and be exposed so that the tray 116 can be more easily refilled with pet food. In some implementations, the base 110 may instead include a snap fit connector such that the tray 116 may be snapped in to couple to the base 110 when filled and snapped out to decouple from the base 110 when being refilled.

The lid 120 may include a front side 122 and a back side 124. The front side 122 and back side 124 may be shaped corresponding to the base 110 such that when the lid 120 is hanging at rest, the lid 120 and the base 110 enclose any pet food within the pet feeder 100 and when the lid 120 is pushed away from rest, the pet food is accessible from outside the pet feeder 100. Accordingly, when the lid 120 is hanging at rest the pet food within the pet feeder 100 may be inaccessible to birds. In some implementations, the lid 120 may be formed of a single piece that is curved, where the front side 122 is formed from a first end of the single piece and the back side 124 is formed from a second end of the single piece.

The front side 122 of the lid 120 may include a protrusion 126 that protrudes outwards away from the back side 124. For example, the protrusion 126 may be a semi-sphere that protrudes outwards of the pet feeder 100 when the lid 120 is hanging at rest. In another example, the protrusion 126 may be box shaped, a semi-ellipsoid, half of a dodecahedron, or some other shape.

The protrusion 126 may be configured such that when a head of a dog pushes against the protrusion 126 to swing the lid 120 to expose the tray 116, ears of the dog do not reach an edge of the lid 120. If a dog's ear reaches the edge of the lid 120 when the lid 120 reaches a resting position, the dog's ear may be hurt by being pinched between the lid 120 and the base 110.

Configuring the protrusion 126 such that ears of the dog do not reach an edge of the lid 120 may prevent ears of dogs from being caught between the lid 120 and the base 110 when dogs remove their heads from within the pet feeder 100 after eating from the tray 116. In some implementations, the protrusion 126 may be configured so that the protrusion 126 protrudes at least three inches, four inches, or some other distance from the rest of the front side 122 of the lid 120.

The protrusion 126 may be located in a center of the front side 122 so that when a dog's head is substantially centered between the wall 112 and the right wall 114 when it puts it's into the pet feeder 100, the dog's head pushes against the center of the protrusion 126. In some implementations, the center of the protrusion 126 may protrude further from the front side 122 than any other part of the protrusion 126.

In some implementations, the protrusion 126 may be transparent such that the pet food in the tray is visible through the protrusion 126. For example, the protrusion 126 may be made of clear plastic. Having the protrusion 126 be clear may enable a pet to determine that there is pet food in the pet feeder 100 without needing to push the lid 120 and may also enable an owner of the pet that may need to refill the tray 116 to see that the tray 116 needs to be refilled without pushing the lid 120.

In some implementations, the back side 124 may include a second protrusion that protrudes outwards away from the front side 122. The back side 124 may be a mirror of the front side 122 such that a dog may open the pet feeder 100 from either side. In other implementations, the back side 124 may not include a protrusion and be substantially flat so that a pet eats from the front side 122.

The coupler 130 may couple the base 110 to the lid 120 such that the lid 120 is capable of swinging between the left wall 112 and the right wall 144. For example, the coupler 130 may be a rod that is rotatably affixed to tops of the left wall 112 and the right wall 114, and also affixed to the lid 120 such that the rod rotates as the lid 120 swings back and forth. In another example, the rod may be fixed to the tops of the left wall 112 and the right wall 114 and not rotate while the lid 120 rotates around the rod. In yet another example, the coupler 130 may be a pair of rotatable plugs and sockets, where the plugs are part of the lid 120 and the sockets are part of the base 110 or vice versa.

The coupler 130, the base 110, and the lid 120 may be arranged so that when no substantial force is being exerted on the pet feeder 100 besides from gravity, the lid 120 rests in place from gravity such that the base 110 and the lid 120 form an enclosure around pet food inside the pet feeder 100. In some implementations, the lid 120 may be weighted so that the lid 120 more quickly or more likely returns to a resting position where the pet food is enclosed. For example, the lid 120 may include a weight that hangs from a line that runs from near the top of the front side 122 to the back side 124.

Figure 2:
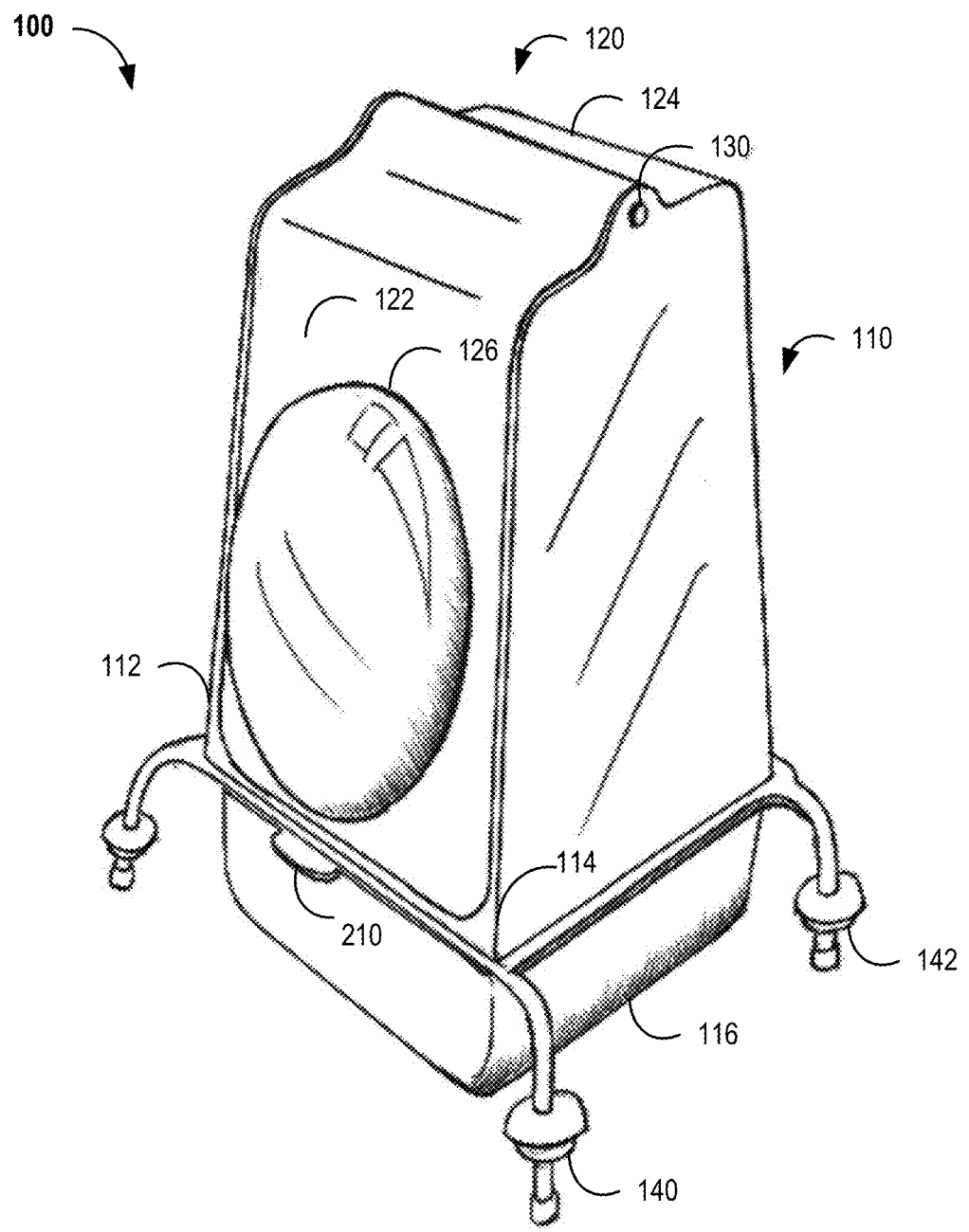
FIG. 2 illustrates a view of an example pet feeder with a lid in a resting position.

FIG. 2 illustrates a view of an example pet feeder 100 with a lid 120 in a resting position. The front side 122 and the edges of a front wall of the base 110 between the left wall 112 and the right wall 114 are aligned so that the inside of the pet feeder 100 is not accessible from outside the pet feeder 100. As shown in FIG. 2, the tray 116 includes a tab 210 that extends outwards from a front of the pet feeder 100 so that the tab 210 may be grasped to pull the tray 116 outwards from the front of the pet feeder 100 and expose the tray 116 to be refilled.

Figure 3:
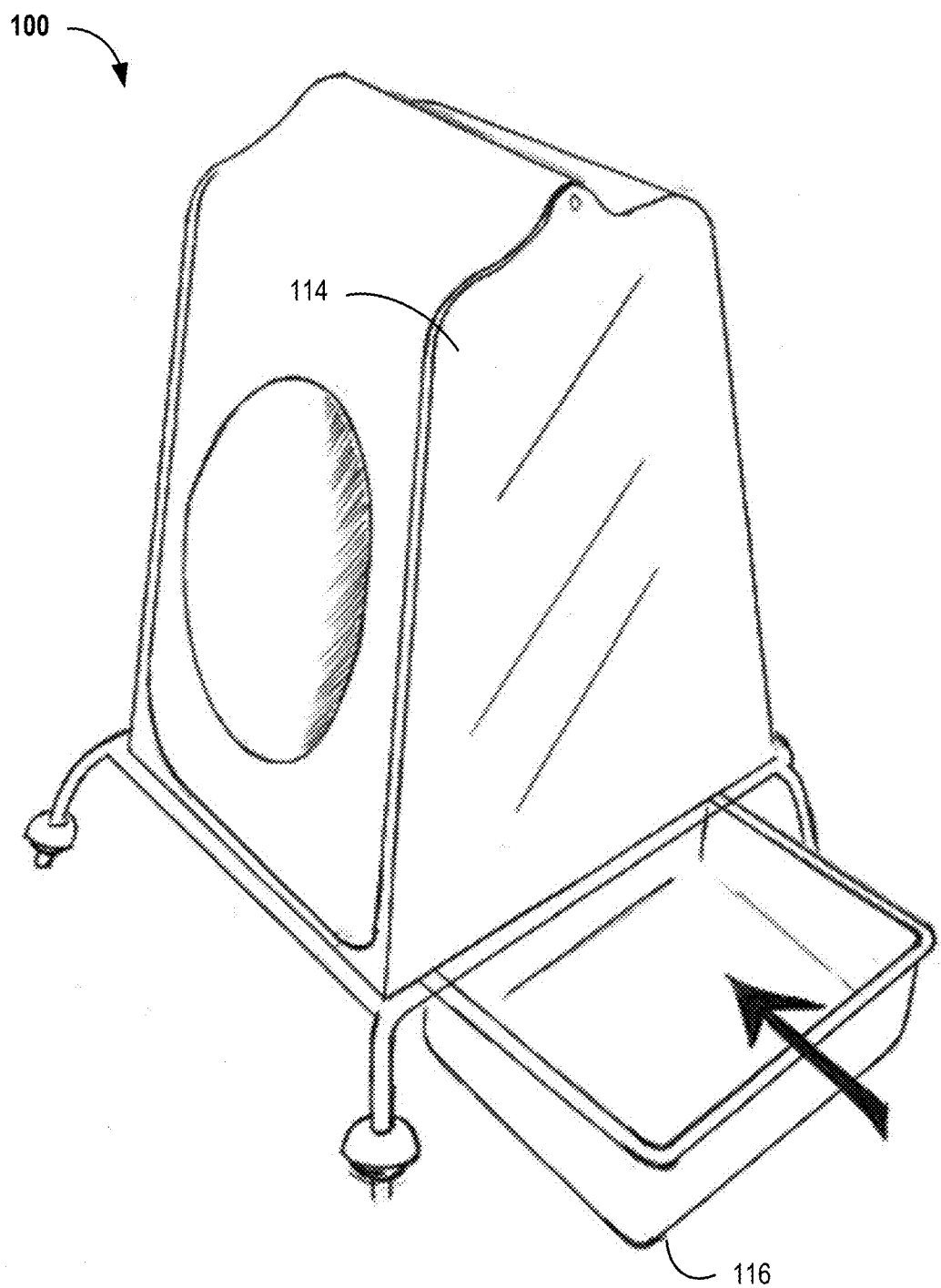
FIG. 3 illustrates a view of an example pet feeder with an exposed tray.

FIG. 3 illustrates a view of an example pet feeder 100 with an exposed tray 116. The tray 116 may be put in an exposed position so that the tray 116 may be easily filled with pet food. As shown in FIG. 3, the tray 116 may extend from the right wall 114 of the base 110. However, in other implementations, the tray 116 may extend from a left, a front, or a back of the base 110. The tray 116 may be exposed by extending along tracks in the base 110.

Figure 4:
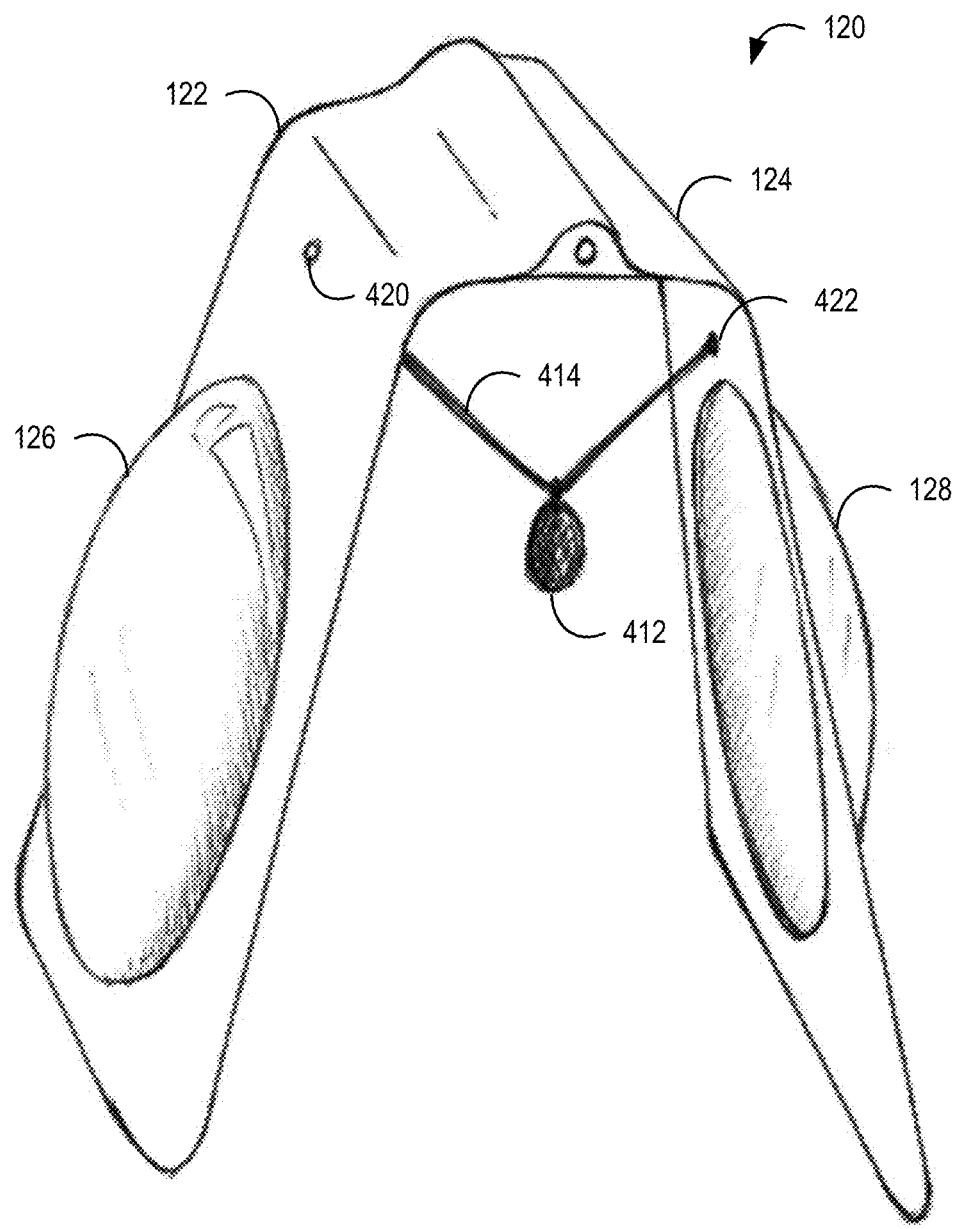
FIG. 4 illustrates a view of an example lid with a hanging weight.
Figure 5A:
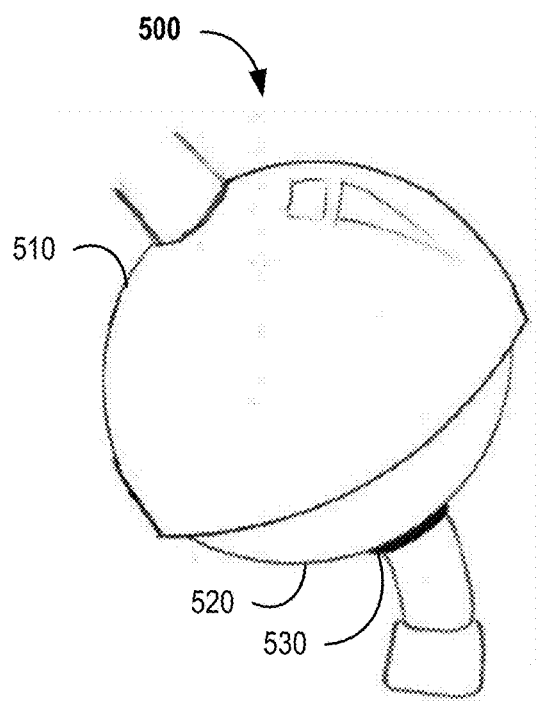
FIGS. 5A-5D illustrate an example ant trap for legs of a pet feeder.
Figure 5B:
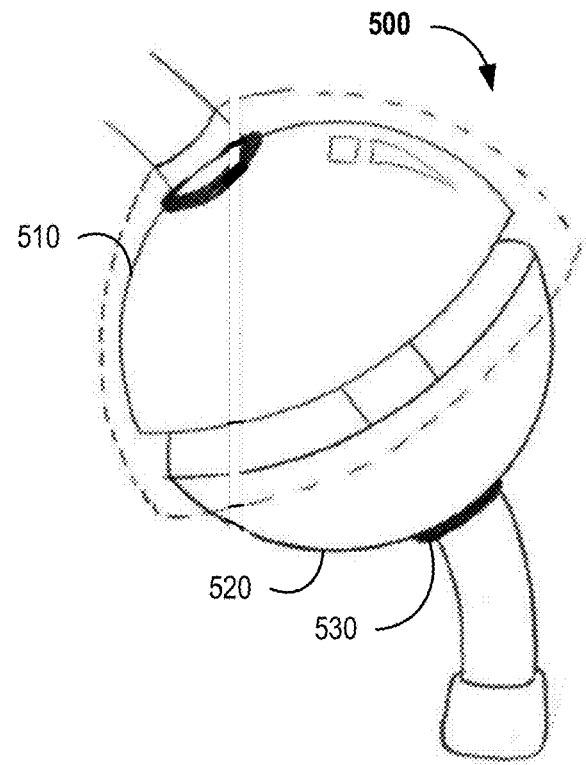
Figure 5C:
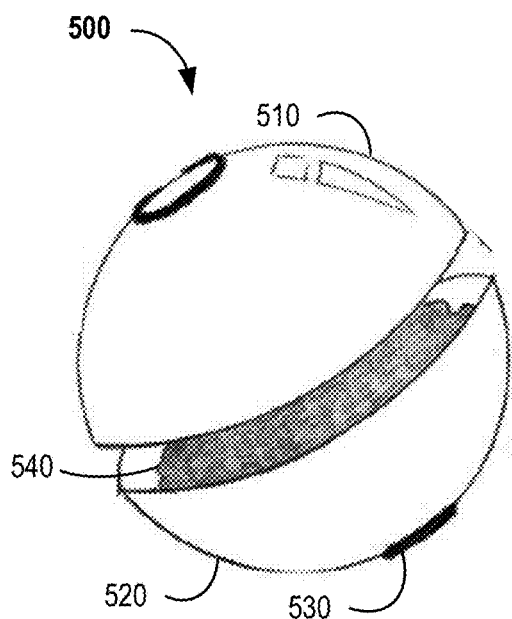
Figure 5D:
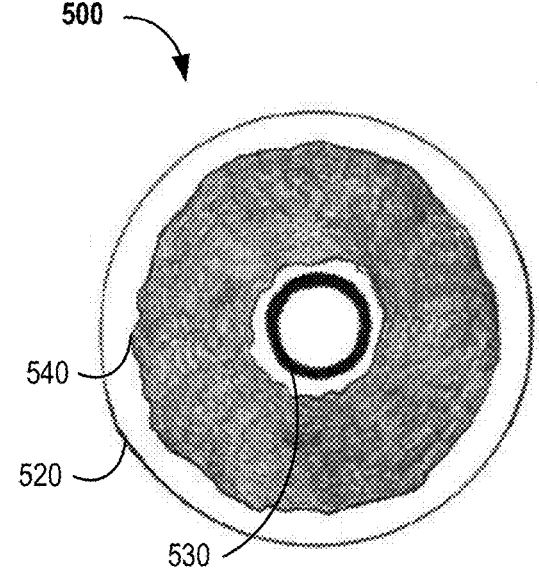

FIG. 4 illustrates a view of an example lid 120 with a hanging weight 412. The hanging weight 412 may hang from a line 414 between a line connection point 420 on the front side 122 of the lid 120 and a line connection point 422 on the back side 124 of the lid 120.

FIGS. 5A-5D illustrate an example ant trap 500 for legs of a pet feeder. The ant trap 500 may include a cover 510, a bottom piece 520, and a rubber seal 530. The bottom piece 520 may include an adhesive 540 which sticks to ants. The cover 510 may be shaped such that the bottom piece 520 is mostly covered. For example, the cover 510 and the bottom piece 520 may both be substantially semi-spherically shaped such that when in use they are separated by two, three millimeters or some other distance so that a pet or person will not accidentally touch the adhesive 540 but ants are forced to touch the adhesive 540 while crawling up a leg of the base 110.

The bottom piece 520 may be removable while the top piece 510 is permanently fixed. The bottom piece 520 may be coupled to the rubber seal 530 such that the bottom piece 520 is held in place on a leg of the base 110 but still removable when force is applied by a person to remove the bottom piece 520.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Thus, though particular embodiments of the subject matter have been described, these, and other embodiments, may also fall within the scope of the following claims.

What is claimed is:

1. A dog feeder comprising:
   a base that includes a left wall and a right wall that extend vertically away from a tray between the left wall and the right wall, where the tray is configured to contain dog food;
   a lid that includes a front side and a back side, where the front side includes a protrusion that protrudes outwards away from the back side; and
   a coupler that couples the base to the lid such that the lid is capable of swinging between the left wall and the right wall,
   wherein the protrusion is configured such that when a head of a dog pushes against the protrusion to swing the lid to expose the tray, ears of the dog do not reach an edge of the lid.

2. The dog feeder of claim 1, wherein the base and lid are configured such that when the lid is in a resting position, the tray can not be accessed by birds.

3. The dog feeder of claim 1, wherein the protrusion is transparent such that dog food in the tray is visible through the protrusion.

4. The dog feeder of claim 1, wherein a weight hangs between the front side and the back side and weights the lid to return to a position in relation to the base.

5. The dog feeder of claim 1, wherein the back side includes a second protrusion that protrudes outwards away from the front side, wherein the second protrusion is configured such that when a head of a dog pushes against the second protrusion to swing the lid to expose the tray, ears of the dog do not reach an edge of the lid.

6. The dog feeder of claim 1, wherein the lid is formed of a single piece that is curved, where the front side is formed from a first end of the single piece and the back side is formed from a second end of the single piece.

7. The dog feeder of claim 1, wherein in the base includes multiple feet that are configured to rest on a surface and lift the tray away from the surface.

8. The dog feeder of claim 1, wherein the base includes four feet.

9. The dog feeder of claim 1, wherein each foot includes an ant trap that includes an adhesive that adheres ants and a cover that at least partially covers the adhesive.

10. The dog feeder of claim 1, wherein the base include tracks that are configured to enable the tray to slide out from under the lid.

* * * * *